June 27, 1967 W. J. KRUPICK ET AL 3,327,538
TWO-AXIS CASE ROTATING GYROSCOPE
Filed March 19, 1964 10 Sheets-Sheet 1

WALTER J. KRUPICK
JAY HOFFMAN
CLAUDIO J. BALLESTER
*INVENTORS*

BY

*Thomas W. Kennedy*
ATTORNEY

WALTER J. KRUPICK
JAY HOFFMAN
CLAUDIO J. BALLESTER
INVENTORS

BY

Thomas W. Kennedy
ATTORNEY

June 27, 1967 W. J. KRUPICK ET AL 3,327,538
TWO-AXIS CASE ROTATING GYROSCOPE
Filed March 19, 1964 10 Sheets-Sheet 3

WALTER J. KRUPICK
JAY HOFFMAN
CLAUDIO J. BALLESTER
*INVENTORS*

BY

*Thomas W. Kennedy*
ATTORNEY

WALTER J. KRUPICK
JAY HOFFMAN
CLAUDIO J. BALLESTER
INVENTORS

BY Thomas W. Kennedy
ATTORNEY

June 27, 1967 W. J. KRUPICK ETAL 3,327,538
TWO-AXIS CASE ROTATING GYROSCOPE
Filed March 19, 1964 10 Sheets-Sheet 5

WALTER J. KRUPICK
JAY HOFFMAN
CLAUDIO J. BALLESTER
INVENTORS

BY

Thomas W. Kennedy
ATTORNEY

WALTER J. KRUPICK
JAY HOFFMAN
CLAUDIO J. BALLESTER
INVENTORS

BY
Thomas W. Kennedy
ATTORNEY

WALTER J. KRUPICK
JAY HOFFMAN
CLAUDIO J. BALLESTER
INVENTORS

BY

Thomas W. Kennedy
ATTORNEY

WALTER J. KRUPICK
JAY HOFFMAN
CLAUDIO J. BALLESTER
INVENTORS

BY

Thomas W. Kennedy
ATTORNEY

June 27, 1967 W. J. KRUPICK ETAL 3,327,538
TWO-AXIS CASE ROTATING GYROSCOPE
Filed March 19, 1964 10 Sheets-Sheet 9

WALTER J. KRUPICK
JAY HOFFMAN
CLAUDIO J. BALLESTER
INVENTORS

BY

Thomas W. Kennedy
ATTORNEY

June 27, 1967  W. J. KRUPICK ET AL  3,327,538
TWO-AXIS CASE ROTATING GYROSCOPE
Filed March 19, 1964  10 Sheets-Sheet 10
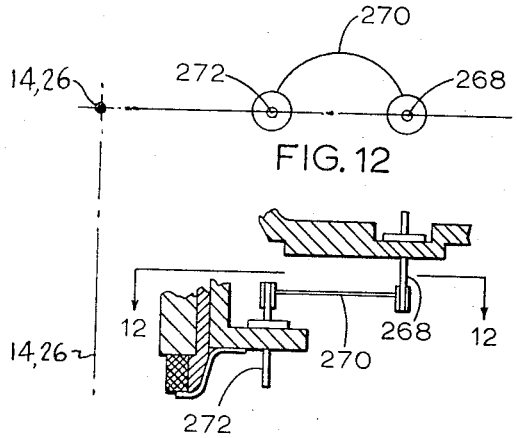
FIG. 12
FIG. 11
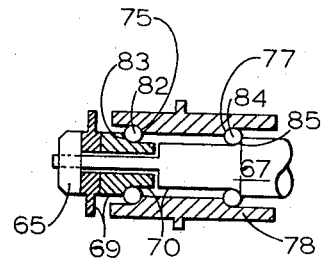
FIG. 13
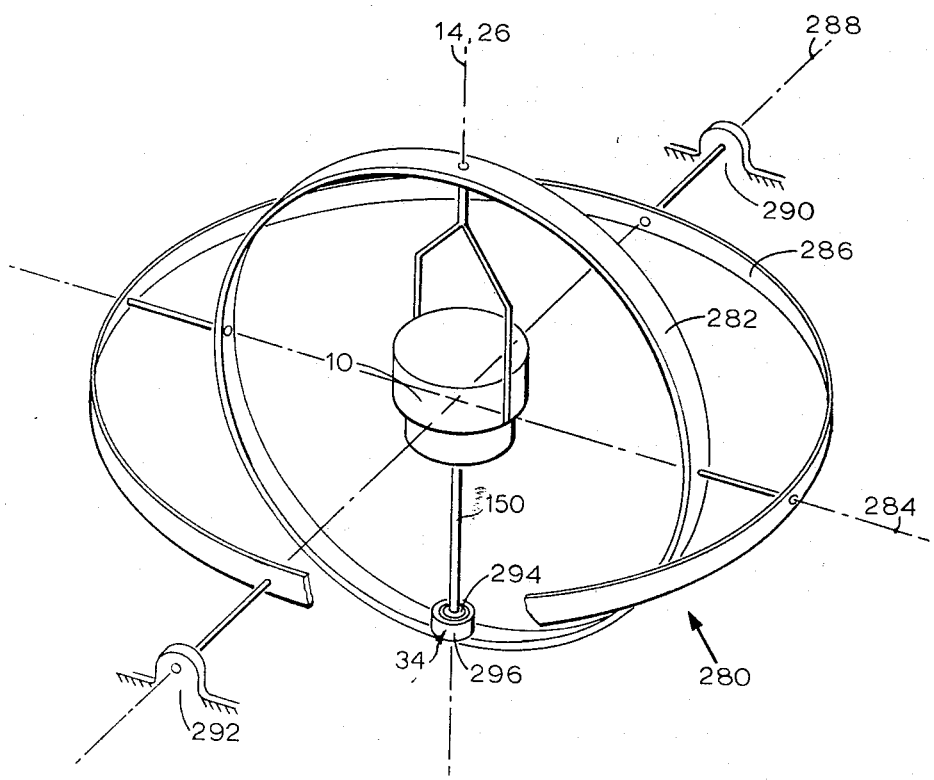
FIG. 14
WALTER J. KRUPICK
JAY HOFFMAN
CLAUDIO J. BALLESTER
INVENTORS
BY
Thomas W. Kennedy
ATTORNEY

United States Patent Office 3,327,538
Patented June 27, 1967

3,327,538
TWO-AXIS CASE ROTATING GYROSCOPE
Walter J. Krupick, Succasunna, Jay Hoffman, Livingston, and Claudio J. Ballester, Wanaque, N.J., assignors to General Precision Inc., Little Falls, N.J., a corporation of Delaware
Filed Mar. 19, 1964, Ser. No. 353,079
21 Claims. (Cl. 74—5)

This application is a continuation-in-part of patent application Ser. No. 80,879, filed Jan. 5, 1961, and matured into Patent No. 3,182,514 for Two Axis Case Rotating Gyroscope.

The present invention relates to gyroscopes and particularly to a vertical type of gyroscope which has anti-friction gimbal pivots.

It is known that gyro drift errors are caused by frictions in the gyro gimbal system, particularly friction in the gimbal pivots. A conventional type of anti-friction gimbal pivot is a compound bearing with a rotatable middle race. Such compound bearings are normally disposed in the radially innermost or "first" gimbal and the adjoining or "second" gimbal of the gyro, which are adjacent the gyro rotor.

A major difficulty with the use of such compound bearings is the provision of drive means for rotating the middle race of each bearing. One type of prior art drive means comprises a motor on each gimbal having two flexible cables connecting to the two gimbal bearing races such as is described in U.S. Patent No. 2,577,942, but such a cable drive has proved to be inherently unsuitable as a rigid, positive drive connection. A second type of prior art drive means comprises a single motor disposed axially outward of the first and second gimbals and gearing connecting the motor to each bearing, such as is described in U.S. Patent No. 2,970,480, but this approach requires an elaborate and bulky gearing arrangement with a shifting center of gravity disposed axially outward of the second gimbal which causes unbalancing of the gimbals.

It is also known that friction in the gyro gimbal system can be further minimized by using a third and fourth gimbal for simultaneously rotating the two-gimbal gyro including its first and second gimbals and rotor as a whole, in order to average out the instantaneous variations in the frictions of the gimbal pivots, such as is described in U.S. Patents Nos. 2,577,942 and 2,924,978. With such a construction, rotation of the first and second gimbals and rotor also provides a supplementary benefit of averaging out any mass unbalance or shifting of the center of gravity of the gimbal system, such as is described in U.S. Patent No. 2,835,132. Hence, an additional major difficulty with the aforementioned two-gimbal gyro having motorized compound bearings and bulky outer gearing is its unsuitability for being mounted on one or more additional gimbals in order to rotate the two-gimbal gyro about a vertical axis.

In accordance with one embodiment of the present invention, rotatable trunnion pins are used instead of compound bearings for the anti-friction gimbal pivots of a two-gimbal gyro. The trunnion pins are driven by gearing disposed radially inwardly of the first gimbal thereby eliminating the bulky gearing for driving the compound bearings previously disposed radially outwardly of the second gimbal. In addition, the trunnion gearing disposed radially inwardly of the first gimbal is connected through one of the trunnion pins to a single motor mounted on the second gimbal thus eliminating the prior-art chain of gearing from each bearing to the drive motor.

Accordingly, it is one object of the invention to provide a two-gimbal gyro having anti-friction gimbal pivots which can be geared together radially inwardly of the first gimbal.

It is another object of the invention to provide a two-gimbal gyro having anti-friction gimbal pivots which can be driven by, and directly connected by gearing to a single motor.

It is a further object of the invention to provide a two-gimbal gyro with anti-friction gimbal pivots which can be mounted on a third gimbal and rotated by a fourth gimbal for case-rotating the three-gimbal unit as a whole about a vertical axis.

It is a still further object of the invention to provide a torquer and pickoff apparatus for a case-rotated two-gimbal gyro with anti-friction gimbal pivots which is mounted on a third gimbal and rotated by a fourth gimbal, in which the pickoff and torquer apparatus is mounted on the first gimbal, and can sense displacement relative to the third gimbal, and can torque relative to the fourth gimbal.

A still further object of the invention is to provide a two-axis, two-gimbal gyro having a rotor unit, and having first and second gimbals with anti-friction pivots, and in which the rotor unit includes a flywheel, a shaft and a motor, and in which the first gimbal can be journaled directly on the rotor shaft.

Therefore, in order to fulfill the above objects, a gyroscope is provided in accordance with the invention having a rotor unit with a spin axis; a first gimbal supporting the rotor for rotation about the spin axis and having a first gimbal pivot axis substantially at right angles to the spin axis; and a second gimbal supporting and pivoting the first gimbal about the first gimbal pivot axis and disposed radially outwardly of the first gimbal and having a second gimbal pivot axis substantially at right angles to the first gimbal pivot axis. Support means are provided for supporting and pivoting the second gimbal about the second gimbal pivot axis and disposed radially outwardly of the second gimbal, the first gimbal and the second gimbal having two pairs of adjoining bore portions axially spaced along and coaxial with the first gimbal pivot axis on opposite portions of said first gimbal and said second gimbal. The second gimbal and the support means have two pairs of adjoining bore portions axially spaced along and coaxial with the second gimbal pivot axis on opposite portions of the second gimbal, each said pair of adjoining bore portions receiving a trunnion pin for rotation relative to its respective bore portions. Coupling means are disposed radially inwardly of said first gimbal and positively interconnect the trunnion pins for joint and simultaneous rotation. Drive means are provided, disposed radially outwardly of the first gimbal and connecting to one of the trunnion pins and continuously turning the pins, to minimize frictional resistance to gimbal pivoting.

Other objects of the invention will become apparent upon reading the annexed detailed description in connection with the drawings wherein like parts are designated by like numerals throughout the several views, and wherein:

FIGURE 11 is a sectional view as taken on line 11—11 of FIGURE 6;

FIGURE 12 is a sectional view as taken on line 12—12 of FIGURE 11;

FIGURE 13 is an enlarged view of a portion of FIGURE 8; and

FIGURE 14 is a schematic view of a gyro platform embodying features of the present invention.

Figure 1:
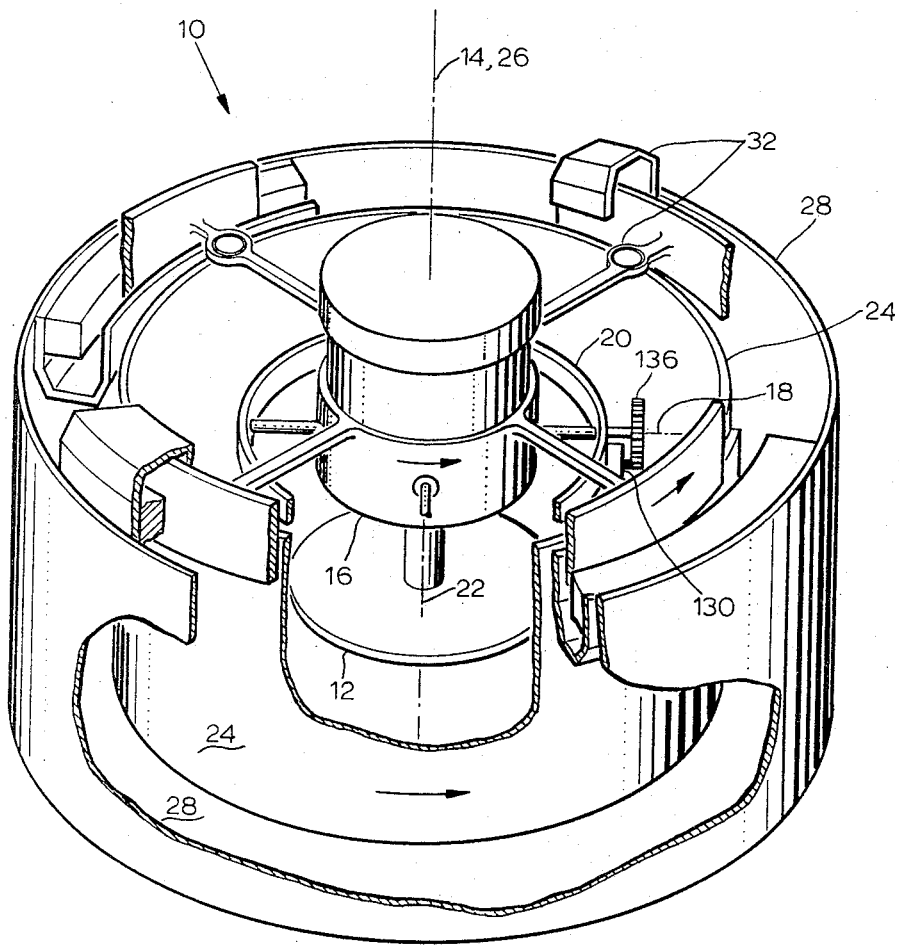
FIGURE 1 is a schematic perspective view of a gyroscope embodying features of the present invention.

Referring to the drawings, one embodiment of the present invention comprises a vertical type of gyroscope 10 having a rotor unit 12 with a spin axis 14, and a radially innermost or first gimbal 16 having a pivot axis 18 and supporting the rotor unit 12 for rotation about the spin axis. A second gimbal 20 having an axis 22, pivotally supports the first gimbal 16 for angular displacement relative to the second gimbal 20 about pivot axis 18. A third gimbal or casing 24, having a rotation axis 26, pivotally supports the second gimbal relative to the third gimbal for angular displacement about second gimbal pivot axis 22. Axis 26 is disposed in a plane including axis 22. Gyroscope 10 also has a radially outermost or fourth gimbal 28 coaxial with third gimbal 24 along rotation axis 26 and supporting the third gimbal 24 for rotation of said third gimbal, and for rotation of those parts supported thereon such as rotor unit 12, first gimbal 16 and second gimbal 20, relative to fourth gimbal 28 about rotation axis 26.

With this type of gyro 10, it is intended that rotation axis 26 be maintained in alignment with rotor spin axis 14. In addition, it is intended that the third and fourth gimbals 24, 28 provide the case-rotation of the two-gimbal unit, including its rotor 12, first gimbal 16 and second gimbal 20, as a whole, about rotation axis 26. Thus, gimbals 24, 28 can have the shape or form of a fork, or a pot, or a casing as well as a gimbal ring. Gimbal 28 has a drive means 30 cooperating with gimbal 24 and providing the rotation of gimbal 24 relative to gimbal 28.

Gyro 10 also has a pickoff and torquer apparatus 32 which is mounted on gimbal 16, and having portions cooperating with gimbals 24, 28, respectively. As best appears in FIGURES 2 and 3, gyro 10 also has a resolver 34, which is mounted on gimbal 24.

Figure 2:
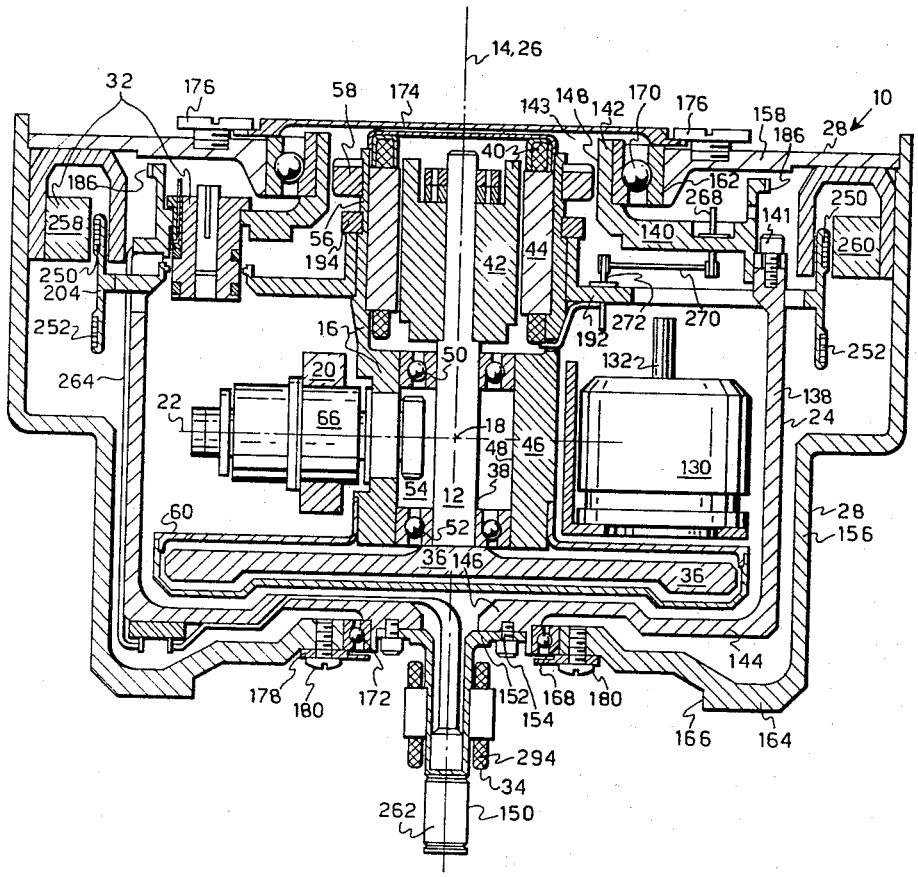
FIGURE 2 is a sectional view of said gyroscope embodying features of the present invention as taken on line 2—2 of FIGURE 4.
Figure 3:
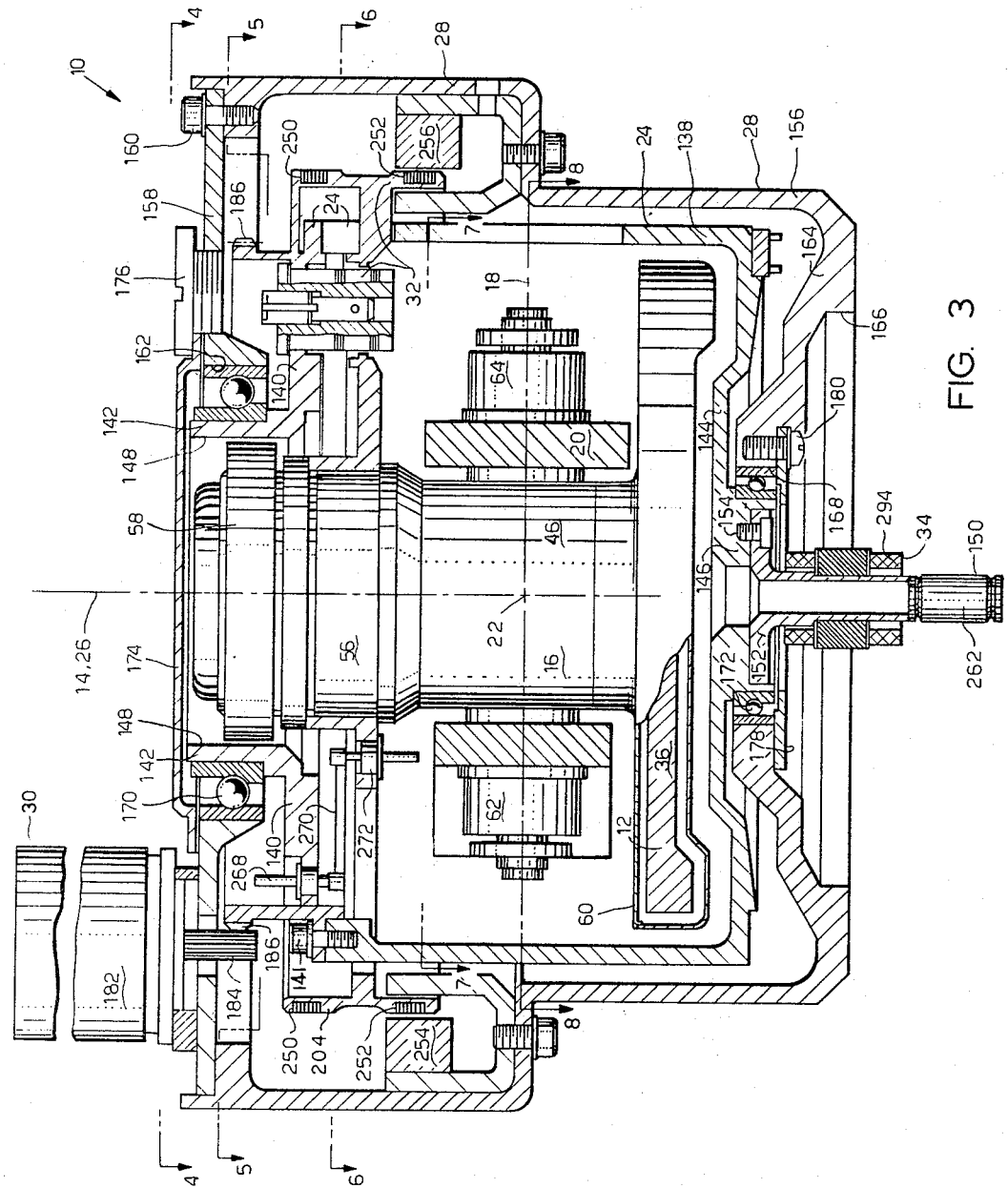
FIGURE 3 is a sectional view of said gyroscope as taken on line 3—3 of FIGURE 4.
Figure 4:
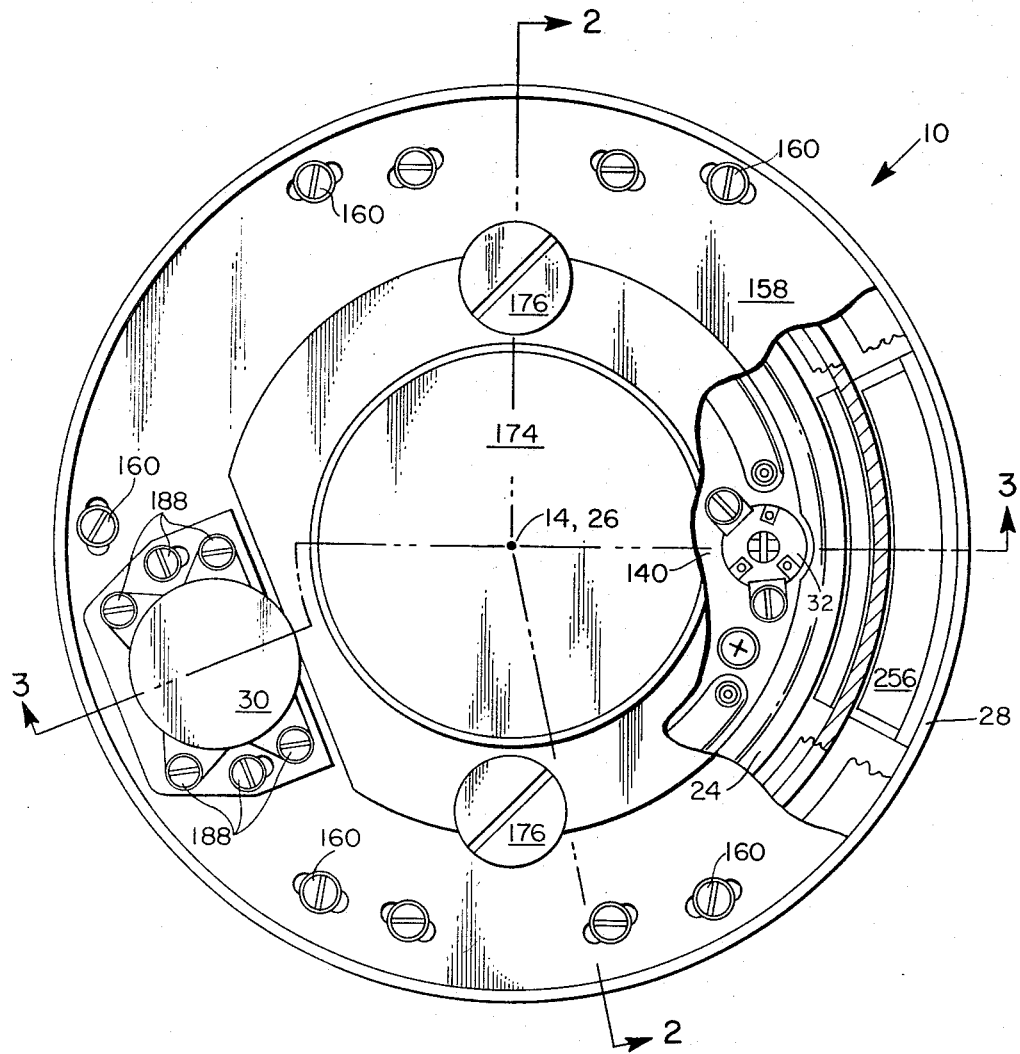
FIGURE 4 is a sectional view as taken on line 4—4 of FIGURE 3.

Continuing the reference to FIGURES 2 and 3, rotor unit 12 is comprised of a flywheel 36, a shaft 38, and a motor 40. One end of shaft 38 carries the flywheel 36; the center of shaft 38 is journaled in gimbal 16; and the other end of shaft 38 is connected to motor 40. Motor 40 has an armature 42 connected to the shaft end and a coil 44 supported on gimbal 16. Flywheel 36 is coaxial with shaft 38 along spin axis 14, and preferably has the shape of a disc. Rotor shaft 38 has a radially outer surface, which is preferably cylindrical, with an axis of curvature coinciding with spin axis 14. With this construction, gimbal 16, which is journaled on the center portion of shaft 38, is disposed between flywheel 36 and motor 40; and flywheel 36, shaft 38 and motor armature 42 rotate relative to gimbal 16 and motor field coil 44.

Gimbal 16 has a peripheral wall or bore portion 46 with a radially inner surface 48, preferably a cylindrical surface with an axis of curvature coinciding with spin axis 14, which is journaled on the center part of shaft 38. Between inner surface 48 and the outer surface of shaft 38 are disposed ball bearings 50, 52 preferably disposed on either side of first gimbal axis 18 and coaxial along spin axis 14. Each of the bearings 50, 52 have a conventional structure, including an inner race fixedly connected to the shaft outer surface, an outer race fixedly connected to the shaft outer surface, an outer race fixedly connected to inner surface 48, and a plurality of bearing balls between said races for minimizing frictional resistance of the rotation of rotor unit 12 relative to gimbal 16. Said axially spaced bearings 50, 52, together with inner surface 48 and shaft outer surface, form an annular space 54.

Gimbal 16 has an integral end portion 56, preferably cylindrical in shape, coaxial with and extending axially outwardly from an upper axial end of wall 46, and connecting to and supporting motor field coil 44. End portion 56 has a radially outer surface with a balancing weight 58 which is preferably annular in shape. Weight 58 is axially adjustable to facilitate delicate balancing of the combined structure of rotor unit 12 and gimbal 16. With this construction, the theoretical mass center of gravity of the structure including rotor unit 12, gimbal 16, and those portions supported by gimbal 16, can be shifted to substantially coincide with the intersection point of the first pivot axis 18 and the spin axis 14, and thereby minimize drift errors caused by gyro out-of-balance.

Gimbal 16 has a shield member 60 surrounding flywheel 36. Shield 60 is preferably a hollow cylindrical discoid, of thin wall construction, enclosing flywheel 36 with appropriate operating clearance. Shield 60 assures that the windage torque from flywheel 36 is applied on its supporting gimbal 16 rather than the adjacent gimbal 20, thereby minimizing a slight drift error caused by a differential torque between first gimbal 16 and second gimbal 20.

Figure 7:
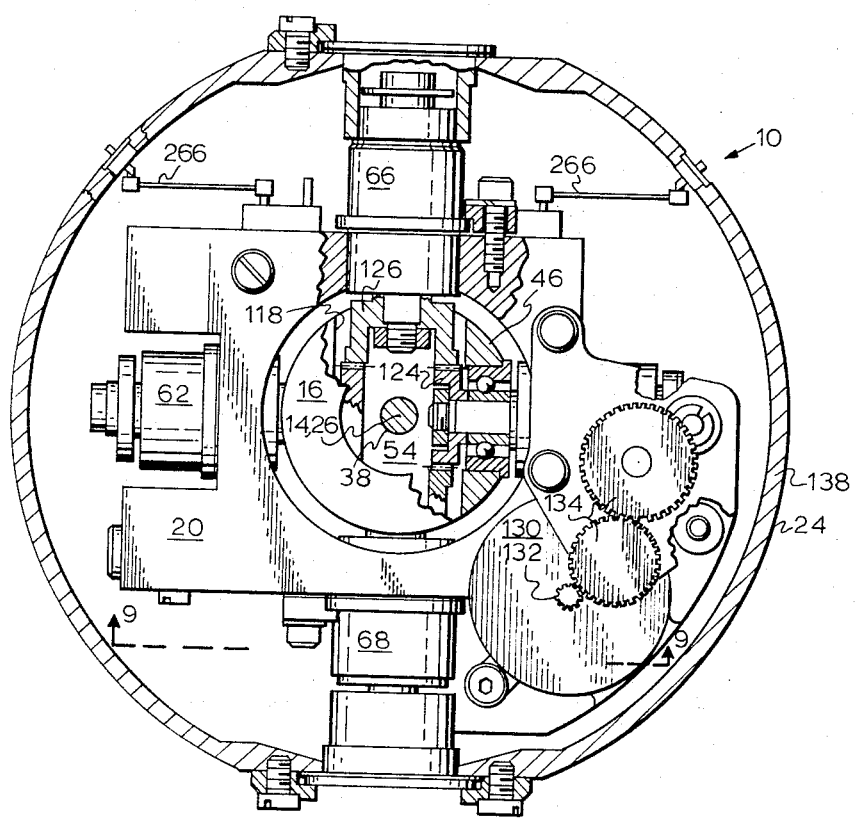
FIGURE 7 is a sectional view as taken on line 7—7 of FIGURE 3.
Figure 8:
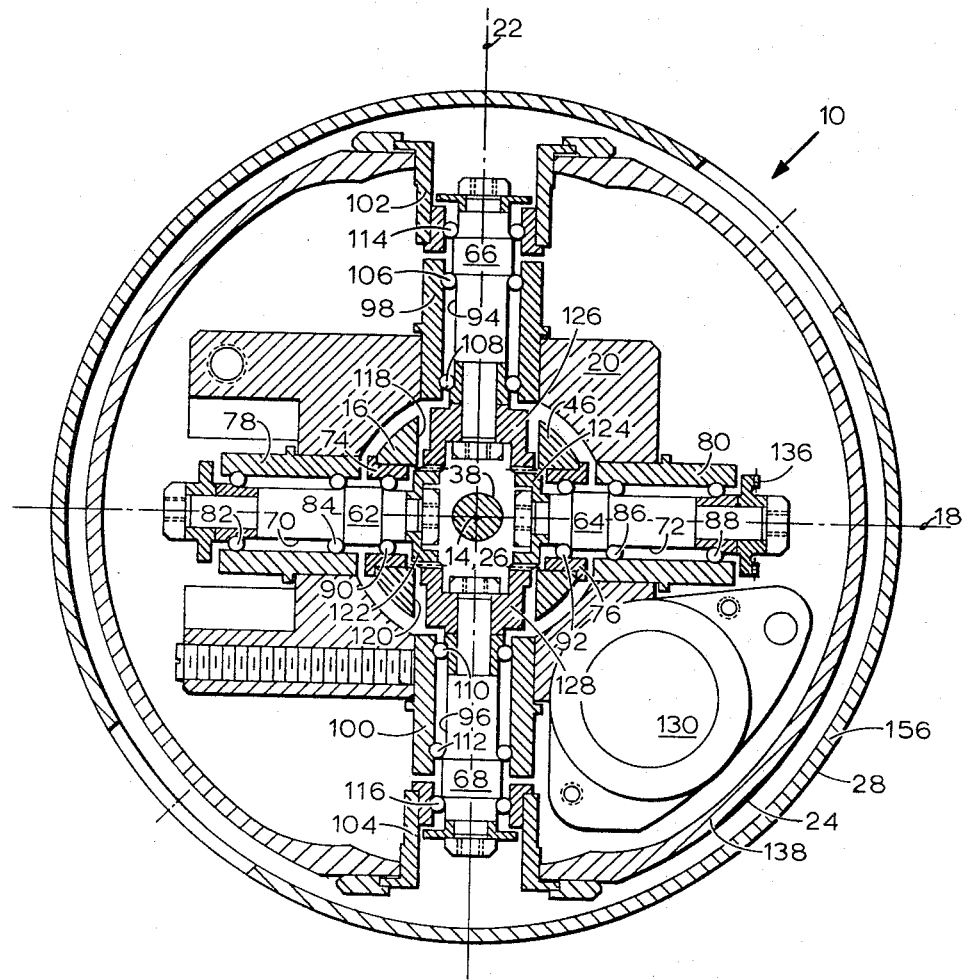
FIGURE 8 is a sectional view as taken on line 8—8 of FIGURE 3.

Referring to FIGURE 3, 7 and 8, gimbal 20 has a first pair of pivot means 62, 64 coaxial with axis 18, which are mounted in gimbal 20 and extend in a radially inward direction, connecting to gimbal 16. Gimbal 20 also has a second pair of pivot means 66, 68 coaxial with axis 22, which are mounted on gimbal 20 and extend in a radially outward direction, connecting to gimbal 24.

Pivots 62, 64 respectively have first and second trunnion pins 70, 72. Gimbal 16 has respective bearing portions 74, 76 for pins 70, 72; and gimbal 20 has bearing portions 78, 80 for pins 70, 72. Thus, pin 70 is received in bearings 74 and 78; and pin 72 is received in bearings 76 and 80.

Bearing 78 receives and surrounds two sets of bearing balls 82, 84 and its adjoining bearing 74 receives and surrounds one set of bearing balls 90; and sets 82, 84, 90 are axially spaced along axis 18 and surround the outer surface of pin 70. Bearing 80 similarly has two sets of bearing balls 86, 88 and its adjoining bearing 76 has one set of bearing balls 92; and sets 86, 88, 92 are axially spaced along axis 18 and surround the outer surface of pin 72.

Pivots 66, 68 respectively have trunnion pins 94, 96. Gimbal 20 has bearing portions 98, 100 receiving pins 94, 96 respectively; and gimbal 24 has bearing portions 102, 104 receiving pins 94, 96 respectively. Thus, pin 94 is received in bearings 98, 102; and pin 96 is received in bearings 100, 104.

Bearing 98 has two sets of bearing balls 106, 108 and its adjoining bearing 102 has one set of bearing balls 114; and sets 106, 108, 114 are axially spaced along axis 22 and surround the outer surface of pin 94. Bearing 100 has two sets of bearing balls 110, 112 and its adjoining bearing 104 has one set of bearing balls 116; and sets 110, 112, 116 are axially spaced along axis 22 and surround the outer surface of pin 96.

Gimbal 16 has two coaxial openings 118, 120 in opposite portions of its wall 46 along axis 22. Pins 94, 96 extend through respective openings 118, 120 with sufficient clearance to allow gimbal 16 to pivot about axis 16 without interference.

Pins 70, 72 respectively have spur gears 122, 124 fixedly connected coaxially to their radially inner ends and disposed radially inwardly of wall 46, and equi-spaced either side of axis 22. Pins 94, 96 respectively have face gears 126, 128 fixedly connected coaxially to their radially inner ends and disposed radially inwardly of wall 46 and equi-spaced either side of axis 18. Each gear 122, 124, 126 or 128 meshes with its two adjoining gears disposed on an axis normal to its own axis. In this way, each of said pins 70, 72, 94 and 96 rotates about its own axis 18 or 22 to minimize its friction torque, and also rotates counter to its opposite, coaxial pin to thereby counterbalance any friction torque from its opposite pin.

Each bearing portion 78, 80, 98, 100 has two axially-spaced, outer-race shoulder portions with inclined bearing surfaces for keeping the respective two sets of bearing balls 82 and 84, 86 and 88, 106 and 108, 110 and 112, axially apart; and each respective pin 70, 72, 94, 96 has two axially-spaced, inner-race shoulder portions with inclined bearing surfaces for keeping the two sets axially together. Each pin has a threaded bolt portion integral with one of its shoulder portions and a sleeve-washer portion integral with its other shoulder portion. The pin bolt portion has a nut or the like for holding the washer portion in place and for adjustably reducing the axial separation of the shoulder portions whereby the two inner races can be preloaded relative to the two outer races and the axial play of each pin relative to its bearings portion can be minimized. For example, as shown in FIGURE 13, pin 70 has bolt portion 67 with nut 65 and sleeve 69; bearing balls 82 bear against outer-race portion 75 and inner-race portion 83; bearing balls 84 bear against outer-race portion 77 and inner-race portion 85; and when pin 70 is preloaded, the part of pin 70 between its races is in tension and the part of bore 78 between its races is in compression.

Figure 10:
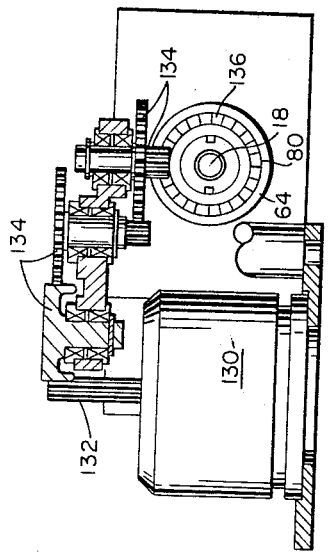
FIGURE 10 is a sectional view as taken on line 10—10 of FIGURE 9.
Figure 9:
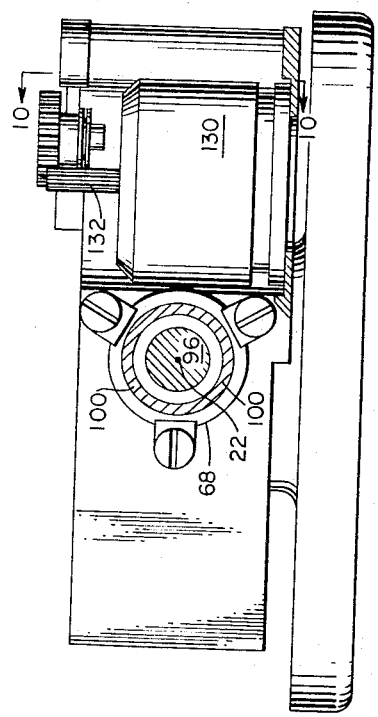
FIGURE 9 is a sectional view as taken on line 9—9 of FIGURE 7.

As appears in FIGURES 2, 7 and 8, gimbal 20 has a motor 130 with a shaft pinion gear 132; and gimbal 20 has a chain of speed-reduction gears 134. Pin 72 has a face gear 136 fixedly and coaxially connected to its radially outer end. Referring to FIGURE 10, reduction gears 134 interconnect motor pinion 132 and trunnion gear 136 whereby motor 130 drives gears 132, 134, 136 and simultaneously rotates trunnion pins 70, 72, 94, 96.

Reverting to FIGURE 2, gimbal 24 has a peripheral wall 138, preferably with an inner surface whose axis of curvature coincides with rotation axis 26. Gimbal 24 has an upper end wall 140 and an axially spaced lower end wall 144, which together with peripheral wall 138 form a cavity receiving the two-gimbal unit including gimbal 20, gimbal 16 and rotor unit 12. Wall 140 is removably connected to wall 138 by bolts 141, or the like, and has an integral annular flange portion 142, projecting axially outwardly therefrom and coaxial with rotation axis 26. Opposite end wall 144 also has an integral annular flange portion 146, also projecting axially outwardly therefrom and coaxial with rotation axis 26.

Flange 142 has a radially inner surface 148 which defines and circumscribes an opening 143 extending through end wall 140. Rotor unit 12 extends through opening 143 and surface 148 faces the radially outer surface of the adjacent portion of rotor unit 12, and is separated therefrom by a sufficiently large annular gap to permit rotor unit 12 to tilt relative to gimbal 24 without an interference with flange 142.

Lower wall 144 has a stub shaft 150 on its axially outer face, which extends in an axially outward direction coaxially with gimbal 24 along axis 26. Shaft 150 has an integral flange portion 152 which is connected to wall 144 by bolts 154, or the like, for mounting shaft 150 on wall 144.

Gimbal 28 has a peripheral wall 156, an upper end wall 158, and a lower end wall 164 axially spaced from the upper wall, forming a cavity receiving the three-gimbal unit including gimbal 24, gimbal 20, gimbal 16 and rotor unit 12. Wall 156 has an inner surface whose axis of curvature preferably coincide with axis 26. Wall 158 is removably connected to peripheral wall 156 by bolts 160, or the like, and is disposed adjacent to wall 140 of gimbal 24. Wall 158 has a bore coaxially surrounding flange 142. Wall 164 is preferably integral with peripheral wall 156, and is adjacent to wall 144 of gimbal 24. Wall 164 has a recess 166 on its axially outer side; and has a bore 168 extending therethrough and coaxially surrounding flange 146 of gimbal 24. Bore 168 preferably has a circular radially inner face whose axis of curvature preferably coincides with axis 26.

Bore 162 fixedly receives to the outer race of an anti-friction ball-bearing unit 170 having an inner race mounted on flange 142. Bore 168 fixedly receives to the outer race of a similar anti-friction ball-bearing unit 172 having an inner race mounted on flange 146.

Wall 158 has a circular plate 174 connected to its axially outer side by bolts 176 for closing the opening of bore 162 and covering rotor unit 12. Wall 164 has a removable ring washer 178 connected to its axially outer side by bolts 180 for supporting therefrom the outer race of ball-bearing unit 172.

Drive means 30 includes a motor 182 mounted on gimbal 28 for rotating the three gimbal unit including gimbal 24, gimbal 20, gimbal 16 and rotor unit 12, relative to gimbal 28. For this purpose, motor 182 has a pinion gear 184 integral with its drive shaft; and gimbal 24 has a ring gear 186 extending in an axially outward direction from wall 140 of gimbal 24, and having gear teeth on its radially outer side which are in mesh with pinion gear 184.

Figure 6:
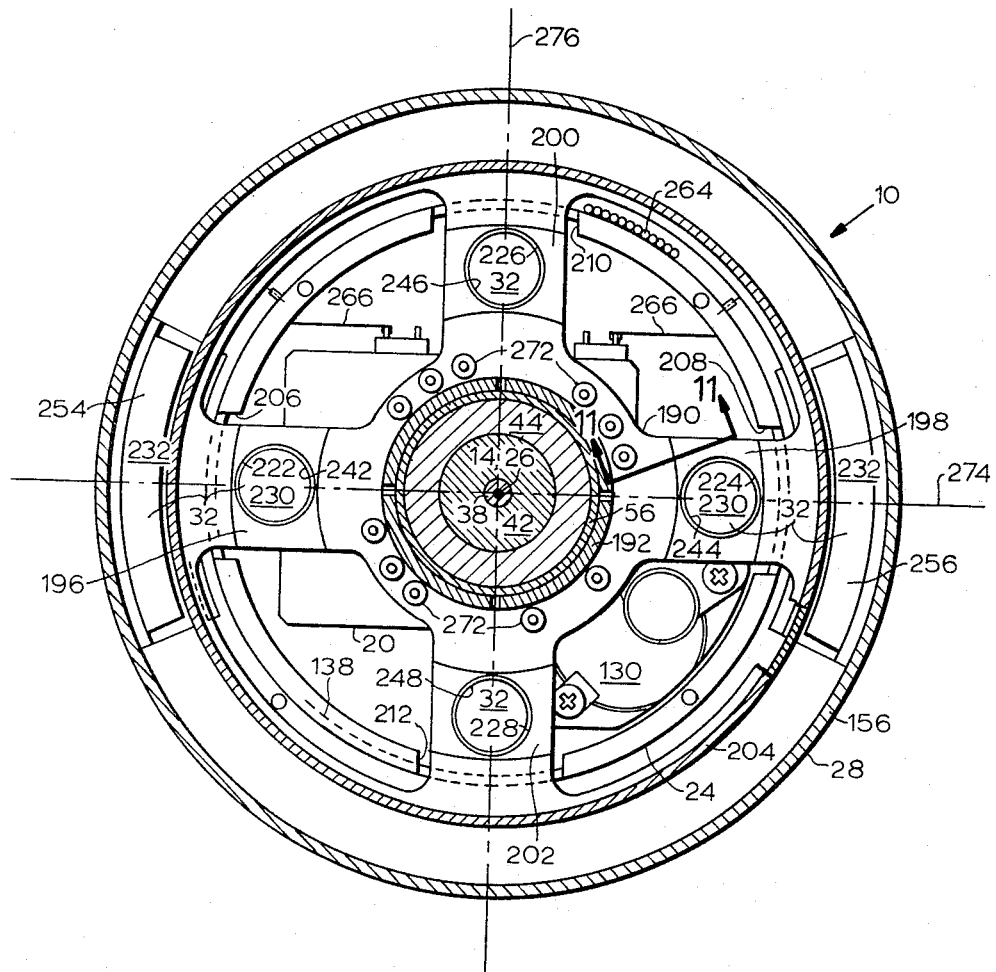
FIGURE 6 is a sectional view as taken on line 6—6 of FIGURE 3.

Referring to FIGURE 6, gimbal 16 has a wheel-shaped bracket 190 projecting radially outwardly from its flange 56. Wheel 190 has a hub portion 192 with a radially inner surface fitting over the radially outer surface of flange 56. Hub 192 is fixedly connected to flange 56 by bolts 194, or the like, for their joint rotation. Wheel 190 has four equiangularly spaced spokes, 196, 198 200, 202, preferably in the shape of flat plates, which are fixedly connected at their inner ends to hub 192 and project radially outwardly therefrom, and which are disposed in a plane substantially parallel to and adjacent the axially inner side of wall 140. Wheel 190 has a rim 204, preferably in the shape of a peripheral flange, with a T-shape cross-section connected to the radially outer ends of spokes 196, 198, 200, 202 and projecting in an axially parallel direction above and below the axially outer and inner faces of said spokes, and preferably having concentric radially outer and inner surfaces whose common axis of curvature is spin axis 14.

Wall 138 has four rectangular openings 206, 208, 210, 212, which have substantially the same peripheral angular spacing as spokes 196, 198, 200, 202, and through which the axially outer portions of said spokes respectively project with clearance.

Figure 5:
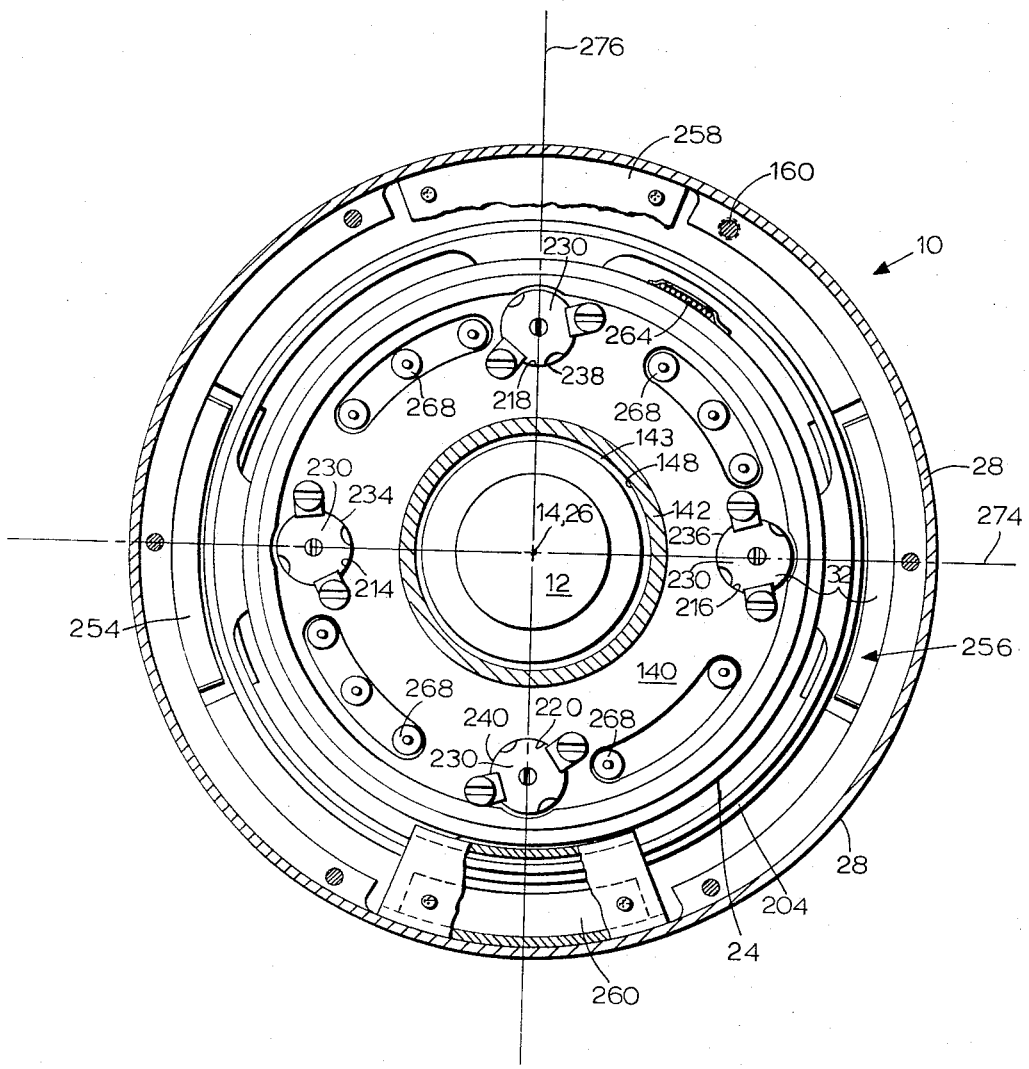
FIGURE 5 is a sectional view as taken on line 5—5 of FIGURE 3.

As best appears in FIGURE 5, wall 140 has four circular openings 214, 216, 218, 220 equi-spaced radially from axis 26 and equi-spaced angularly from each other about said axis 26. The axes of said openings in wall 140 are substantially parallel to each other and to axis 26. Referring to FIGURE 6, spokes 196, 198, 200, 202 respectively have four circular openings 222, 224, 226, 228, similarly located so that each spoke opening is substantially coaxial with its corresponding circular adjacent opening in wall 140.

Pickoff and torquer apparatus 32 has a pickoff portion 230 and a torquer portion 232. Pickoff portion 230 has four primary coil sleeves 234, 236, 238, 240, (FIGURE 5) coaxially received within openings 214, 216, 218, 220 respectively, each sleeve having a pair of axially spaced primary coil windings on its radially outer surface. Pickoff portion 230 also has four secondary coil rings 242, 244, 246, 248 (FIGURE 6) surrounding respective sleeves 234, 236, 238, 240, and coaxially received within openings 222, 224, 226, 228 respectively, each ring having a single secondary coil winding carried on its radially inner surface, which surrounds its respective sleeve windings. With this construction, each secondary coil is located midway between its respective pair of primary coils when spin axis 14 is aligned with gimbal axis 26. In this way, any inclination of spin axis 14 relative to axis 26 causes a movement of one or more said secondary coils from their midway position thereby providing pickoff signals. Each such pickoff sleeve-and-ring unit is similar to an air-core differential transformer.

Torquer portion 232 has a pair of torquing coils 250, 252 (FIGURES 2 and 3) each wrapped around the radially outer surface of rim 204, axially spaced from one another and concentric about axis 26. Torquer portion 232 also has four magnets 254, 256, 258, 260 (FIGURE 6) each having an arcuate longitudinal shape and a U-shaped cross-section as appears in FIGURES 2 and 3. Magnets 254, 256 (FIGURE 3) have flanges pointing axially inwardly and are mounted on upper end wall 158; and magnets 258, 260 (FIGURE 2) having flanges pointing axially outwardly are mounted on a shoulder portion of peripheral wall 156. Magnets 254, 256 overlap with clearance the axially outer flange of rim 204, while magnets 258, 260 overlap with clearance the axially inner flange of rim 204. Magnets 254, 256 are disposed adjacent diametrically opposite quadrants of rim 204, while magnets 258, 260 are disposed adjacent the remaining two diametrically opposite quardrants of rim 204. Magnets 254, 256, 258, 260 are preferably arranged substantially 90° apart. With this construction, when spin axis 14 is aligned with gimbal axis 26, ther eare substantially no unbalanced torques on gimbal 16 about axes 18 and 22. A slight inclination of axis 14 relative to axis 26 causes displacements of at least one of the pickoff secondary rings 242, 244, 246, 248 relative to its respective pickoff primary coil sleeves 234, 236, 238, 240 in a direction substantially parallel to axis 26 which signals an amplifier (not shown) and activates the torquer coils 250, 252. Thus, the magnetic flux of the stationary magnets 254, 256, 258, 260 exert forces in a direction substantially parallel to axis 26 causing a torque and precession which aligns axes 14 and 26.

Electrical power from an exterior source (not shown) is supplied to the pickoff and torquer apparatus 32 and to the motors 130, 182 of the gyro. To this end, stub shaft 150 has slip rings 262 (see FIGURE 2), which cooperate with a suitable brush block (not shown). Gimbal 24 has a tape 264 (FIGURE 2) including thirteen wires connecting to slip rings 262, extending through hollow stub shaft 150 (see FIGURES 5 and 6), and extending over the outer surface of gimbal 24 (see FIGURES 6 and 7). Tape 264 has two wires connected to trunnion motor 130 by two straight pigtail leads 266 (see FIGURES 6 and 7.) Wall 140 has eleven upper electrical terminals 268 (see FIGURES 2, 3, 5, 11 and 12). Wheel bracket 190 has eleven lower terminals 272 connecting to the respective upper terminals 268 by eleven arcuate pigtail leads 270 (see FIGURES 2, 3, 6, 11 and 12). Wheel bracket 190 has eleven wires (not shown), each connecting at one end respectively to one of the lower terminals 272. The opposite ends of the wires (not shown) are connected as follows: two connect to coil 250; two connect to coil 252; two connect to coil rings 242, 244; two connect to coil rings 246, 248; and three connect to motor 182.

Gimbal 28 has, for reference purposes, two reference axes 274, 276, substantially at right angles to each other and in a plane which is substantially at right angles to rotation axis 26. In FIGURES 5 and 6, for ease of illustration, reference axes 274, 276 are shown respectively aligned with pivot axes 18, 22. Opposite magnets 254, 256 are preferably arranged symmetrically about or bisected by reference axis 274; and opposite magnets 258, 260 are also arranged symmetrically about or bisected by reference axis 276. In operation, the three-gimbal unit including gimbals 16, 20 and 24 with pivot axes 18, 22 rotate about axis 26 relative to gimbal 28 and its reference axes 274, 276.

As illustrated in FIGURE 14, gyro 10 is preferably mounted on a platform 280, and arranged so that gyro axis 26 is the platform azimuth axis and gyro gimbal 28 is the platform azimuth gimbal. In addition to azimuth gimbal 28, platform 280 has a pitch gimbal 282, which pivotally supports azimuth gimbal 28 about azimuth axis 26, and which has a pitch axis 284, substantially at right angles to azimuth axis 26. Platform 280 also has a roll gimbal 286, which pivotally supports pitch gimbal 282 about pitch axis 284, and which has a roll axis 288, substantially at right angles to pitch axis 284. Platform 280 also has support members 290, 292, which pivotally supports roll gimbal 286 about roll axis 288, and which can be fixedly connected to a vehicle (not shown).

Resolver 34 has a rotor body 294 fixedly connected to stub shaft 150 of gyro gimbal 24 (see FIGURES 2, 3 and 14), and has a stator 296, fixedly connected to platform pitch gimbal 282 (see FIGURE 14). With this construction, resolver 34 can provide the coordinate resolution of the gyro unit including gimbal 16, gimbal 20 and gimbal 24, and its pivot axes 13, 22, relative to the platform azimuth gimbal 28 and its reference axes 274, 276; and resolver 34 can also provide the coordinate resolution of the platform 280, including pitch gimbal 282 and roll gimbal 286 and its pitch 284 and roll axis 288, relative to said azimuth gimbal 28 and its reference axes 274, 276. Hence, resolver 34 can provide the simultaneous coordinate resolution of the case rotation of gyro 10, and also the coordinate resolution of the rotation of the vehicle (not shown) and the platform 280.

While the present invention has been described in the preferred embodiment, it will be obvious to those skilled in the art that various modifications can be made therein within the scope of the invention; and it is intended that the appended claims cover all such modifications.

What is claimed and desired to be secured by Letters Patent of the United States is:

1. A gyroscope comprising:
    a rotor having a spin axis;
    a first gimbal supporting the rotor for rotor rotation about the spin axis and having a first gimbal pivot axis substantially at right angles to the spin axis;
    a second gimbal supporting and pivoting the first gimbal about the first gimbal pivot axis and disposed radially outwardly of the first gimbal and having a second gimbal pivot axis substantially at right angles to the first gimbal pivot axis;
    a support means supporting and pivoting the second gimbal about the second gimbal pivot axis and disposed radially outwardly of the second gimbal;
    the second gimbal having a first pair of pivot means rotatable relative to said gimbals and axially spaced along and coaxial with the first gimbal pivot axis and extending in a radial inward direction from opposite portions of the second gimbal and connecting respectively to adjoining portions of the first gimbal;
    the second gimbal having a second pair of pivot means rotatable relative to the gimbals and support means and being axially spaced along and coaxial with the second gimbal pivot axis and extending from opposite portions of the second gimbal in a radial inward direction toward the first gimbal and in a radial outward direction and connecting respectively to adjoining portions of the support means; and
    coupling means disposed radially inwardly of said first gimbal and positively interconnecting said four pivot means for joint and simultaneous rotation of all pivot means.

2. A gyroscope as claimed in claim 1 including:
    drive means disposed radially outwardly of said first gimbal and connecting to one of said pivot means and continuously turning said four pivot means for minimizing frictional resistance to gimbal pivoting.

3. A gyroscope as claimed in claim 2 in which:
    the first gimbal and the second gimbal have two pairs of adjoining bore portions axially spaced along and coaxial with the first gimbal pivot axis on opposite portions of said first gimbal and said second gimbal; the second gimbal and the support means have two pairs of adjoining bore portions axially spaced along and coaxially with the second gimbal pivot axis on opposite portions of the second gimbal; and each said pair of adjoining bore portions receives a trunnion pin for rotation of said trunnion pin relative to its respective bore portions.

4. A gyroscope as claimed in claim 3 in which one bore portion of each pin has two sets of bearings each with an inner race connecting to pin and an outer race connecting to the bore portion, the pin having pre-loading means urging the inner races against the outer races.

5. A gyroscope as claimed in claim 2 in which the first gimbal has a pair of openings on opposite portions of said gimbal disposed along the second gimbal pivot axis and respectively receiving with clearance said trunnion pins disposed coaxially on said axis.

6. A gyroscope as claimed in claim 5 in which each said trunnion pin has a radially inner portion disposed radially inwardly of the inner surface of the first gimbal; and including gear means interconnecting said adjoining inner portions of said trunnion pins for their joint rotation relative to said inner gimbal.

7. A gyroscope as claimed in claim 6 in which said gear means interconnecting said inner portions of said four trunnions comprises four gears connected in series with one of said gears mounted respectively on each said trunnion pin whereby oppositely facing gears and their respective trunnion pins of each pair of gears rotate opposite to each other.

8. A gyroscope as claimed in claim 6 in which said trunnion gears are disposed between the outer surface of said rotor shaft and the inner surface of said first gimbal.

9. A gyroscope as claimed in claim 2 in which the rotor has a rotor shaft with a radially outer surface and the first gimbal has a radially inner surface concentric about said spin axis with said shaft outer surface and forming an annular space therebetween;

the first gimbal has a pair of axially-spaced ball-bearing means disposed in said annular space for rotatably supporting said rotor shaft, and forming an annular chamber therebetween;

said rotor unit has a rotor flywheel mounted at one axial end of the rotor shaft and has a motor mounted on the opposite axial end of the rotor shaft, said motor having an annular radially outer portion connected to said first gimbal; and said coupling means includes a chain of gears disposed in said annular chamber.

10. A gyroscope as claimed in claim 2 in which said support means supporting the second gimbal is a third gimbal having a rotation axis intended to be maintained in alignment with said rotor spin axis, said third gimbal rotation axis being disposed in a plane including said second gimbal pivot axis.

11. A gyroscope as claimed in claim 10 including a fourth gimbal being coaxial with and rotatably supporting the third gimbal about said third gimbal rotation axis for rotation of said rotor unit, first gimbal, second gimbal, and third gimbal about said axis relative to said fourth gimbal.

12. A gyroscope as claimed in claim 11 in which said fourth gimbal has drive means mounted thereon and connecting to said third gimbal to cause said relative rotation therebetween.

13. A gyroscope as claimed in claim 11 in which said rotation axis of the third and fourth gimbals has a common point of intersection with said first and second gimbal axes, and said rotor spin axis extends through and pivots about said common point of intersection;

said gyroscope has sensing means to sense an angular inclination between said rotor spin axis and said rotation axis; and said gyroscope has torquing means cooperating with said sensing means to align the spin axis and the rotation axis.

14. A gyroscope as claimed in claim 13 in which said sensing means has a plurality of air-core differential transformers, each having a pair of coaxial primary coils mounted on the third gimbal and a single secondary coil coaxial with each pair of primary coils and mounted on the first gimbal.

15. Anti-friction pivot means for use in a gimbal system having a first gimbal with a first pivot axis and a second gimbal with a second pivot axis, the first and second axis being in a common plane and substantially at right angles to each other, including:

a first and second pair of trunnion pins with the first pair of trunnion pins pivotally supporting the first gimbal from the second gimbal about the first axis and with the second pair of trunnion pins pivotally supporting the second gimbal about the second axis; and each said pin of each said pair of pins extending through the first gimbal and each pin having an end portion disposed radially inwardly of the first gimbal and connecting to the respective ends of both pins of said other pair of pins whereby rotary movement of one pin causes a joint rotary movement of all the pins.

16. Anti-friction pivot means as claimed in claim 15 in which said second gimbal has a first and second pair of bore portions with each bore portion respectively receiving one of said trunnion pins, and each pin has two connecting, coaxial, longitudinal portions respectively having thrust-type bearings with inner and outer bearing races, said pin portions being axially adjustable for pre-loading the bearing races to thereby minimize axial play of each pin relative to its bore.

17. A rotor and gimbal structure for a gyroscope comprising:

a flywheel and a shaft with a common axis, the shaft having an axial end portion integral with the flywheel and having a radially outer surface whose axis of curvature is the spin axis;

a gimbal coaxial with the shaft along the spin axis having a radially inner surface whose axis of curvature is the spin axis forming a bore portion in which the shaft is journaled for rotation of the shaft and flywheel relative to the gimbal; and a motor having radially inner and outer portions, the inner portion of the motor being mounted on the end of the shaft opposite to the flywheel, the outer portion of the motor being mounted on the gimbal for rotation of the motor inner-portion, the flywheel and the shaft, relative to the motor outer-portion and the gimbal.

18. A rotor and gimbal structure as claimed in claim 17 in which the gimbal has a pivot axis substantially at right angles to the spin axis and has pivot means for pivoting the gimbal about said pivot axis, said pivot axis and spin axis having a point of intersection substantially coinciding with the mass center of gravity of the rotor and gimbal structure, and the gimbal having an adjustable weight movable in a direction substantially parallel to the spin axis for selectively shifting said center of gravity to acquire said coincidence of the point of intersection and the center of gravity.

19. A torquer and pickoff apparatus for a gyroscope having a rotor with a spin axis and having a gimbal system supporting the rotor and including a radially inner gimbal connecting to said rotor and including a pair of coaxial gimbals disposed radially outwardly of said inner gimbal having a common axis of rotation for rotation relative to each other about said rotation axis, comprising:
- support members connecting to and cantilevering radially outwardly from said inner gimbal;
- torquer portions mounted on the support members cooperating with the outermost of said pair of outer gimbals; and
- pickoff portions mounted on the support members and cooperating with the innermost of said pair of outer gimbals and disposed radially inwardly of the torquer portions for aligning the rotor spin axis with said rotation axis.

20. A platform having an azimuth axis, a pitch axis substantially at right angles to said azimuth axis, and a roll axis substantially at right angles to said pitch axis for mounting on a vehicle including:
- a roll gimbal having pivot means supported by the vehicle for pivoting about the roll axis;
- a pitch gimbal supported by the roll gimbal for pivoting about the pitch axis;
- an azimuth gimbal supported by the pitch gimbal for pivoting about the azimuth axis;
- a gyro having a rotor unit with a spin axis and having a gyro gimbal system pivotally supporting the rotor unit and rotatably supported by the azimuth gimbal for rotation relative thereto; and
- a coordinate resolver having a rotor body fixedly connected to the gyro gimbal system and a stator body coaxial with the rotor body fixedly connected to the platform pitch gimbal for simultaneously resolving the rotation of the gyro gimbal system relative to the azimuth gimbal and the rotation of the platform and vehicle relative to the azimuth gimbal.

21. A platform as claimed in claim 20 in which said gyro gimbal system includes:
- a first gimbal with a first pivot axis rotatably supporting the rotor;
- a second gimbal with a second pivot axis pivotally supporting the first gimbal; and
- a third gimbal pivotally supporting the second gimbal, having a common rotation axis with the azimuth gimbal, and coaxially connected to said resolver rotor body.

References Cited

UNITED STATES PATENTS 2,855,781   10/1958   Alburger _____ 74—5
3,200,652   8/1965   Chaggaris _____ 74—5

FRED C. MATTERN, Jr., *Primary Examiner.*

PALMER W. SULLIVAN, *Examiner.*

C. J. HUSAR, *Assistant Examiner.*